US010361946B2

(12) United States Patent
Pan et al.

(10) Patent No.: US 10,361,946 B2
(45) Date of Patent: Jul. 23, 2019

(54) METHODS AND SYSTEMS FOR DETERMINING DATA TRANSPORT PATHS THROUGH DATA TRANSPORT

(71) Applicant: Infinera Corp., Annapolis Junction, MD (US)

(72) Inventors: Ping Pan, San Jose, CA (US); Abhinava Shivakumar Sadasivarao, Milpitas, CA (US); Sharfuddin Syed, San Jose, CA (US); Michael Frendo, Pleasanton, CA (US); Chris Liou, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 408 days.

(21) Appl. No.: 13/931,523

(22) Filed: Jun. 28, 2013

(65) Prior Publication Data

US 2014/0351397 A1    Nov. 27, 2014

Related U.S. Application Data

(60) Provisional application No. 61/826,954, filed on May 23, 2013.

(51) Int. Cl.
*G06F 13/00* (2006.01)
*H04L 12/729* (2013.01)

(52) U.S. Cl.
CPC ................. *H04L 45/125* (2013.01)

(58) Field of Classification Search
CPC ........... H04L 41/0213; H04L 29/08072; H04L 29/06; H04L 41/22; H04L 41/12; H04L 5/22; H04L 5/24; H04L 49/3081; H04L 2012/563; H04L 2012/5619;
(Continued)

(56) References Cited

U.S. PATENT DOCUMENTS

2004/0170173 A1* 9/2004 Pan ..................... H04J 3/1617
370/392
2009/0245289 A1* 10/2009 Sprague .................. H04Q 3/68
370/498

OTHER PUBLICATIONS

Infinera® "Infinera Launches End-to-End Digital OTN Networking Integrated Capability Enables Programmable Multi-Service OTN Switching Throughout the Network", pp. 1-3, Sep. 20, 2010.*
(Continued)

*Primary Examiner* — Robert B Harrell
(74) *Attorney, Agent, or Firm* — David L. Soltz (57) ABSTRACT

Methods and systems for determining data transport paths through data transport subnetworks include a method for receiving, by circuitry of a computer system, a service request message from an edge node coupled with the circuitry of the computer system, the service request message including information indicative of: a first unique identifier of an ingress port of a first core node, the first core node being within a transport subnetwork; a second unique identifier of an egress port of a second core node within the transport subnetwork; and a requested transport path bandwidth. The method further comprises determining, by the circuitry of the computer system, a transport path through the transport subnetwork between the first core node and the second core node based on the service request message; and forming the transport path between the ingress port of the first core node and the egress port of the second core node.

17 Claims, 6 Drawing Sheets

(58) Field of Classification Search
CPC .. H04L 12/5601; H04L 45/125; H04J 3/1647; G06F 13/22; G06F 13/00; H04Q 11/0478
USPC ...................................... 370/395.3; 709/223
See application file for complete search history.

(56) References Cited

OTHER PUBLICATIONS

ITU-T Recommendation G.709 "Interfaces for the optical transport network (OTN)." Dec. 2009.
ITU-T Recommendation G.872, "Architecture of optical transport networks", Nov. 2001.
Mannie, E., "Generalized Multi-Protocol Label Switching (GMPLS) Architecture", RFC 3945, The Internet Society, Oct. 2004.
Kompella, Ed, "OSPF Extensions in Support of Generalized Multi-Protocol Label Switching (GMPLS)", RFC 4203, Network Working Group, Standards Track, Oct. 2005.
Katz, D., Traffic Engineering (TE) Extensions to OSPF Version 2, RFC 3630, Network Working Group, Standards Track, Sep. 2003.
Kompella, Ed, "Routing Extensions in Support of Generalized Multi-Protocol Label Switching (GMPLS)", RFC 4202, Network Working Group, Standards Track, Oct. 2005.
Moy, J., OSPF Version 2, RFC 2328, Network Working Group, Standards Track, Apr. 1998.
ITU-T Recommendation G.8080 "Architecture for the automatically switched optical network.", Feb. 2012.

\* cited by examiner

```
<chassis>
  <optical-switch>
    <name>XTC1</name>
    <connection action="merge">
      <source>
        <channel-id>urn:192.4.5.6:1-A-1-2-3</channel-id>
      </source>
      <destination>
        <channel-id>urn:192.5.6.7:2-A-3-4-5</channel-id>
      </destination>
      <bandwidth>40,000,000,000</bandwidth>
    </connection>
  </optical-switch>
</chassis>
```
— 138

METHODS AND SYSTEMS FOR DETERMINING DATA TRANSPORT PATHS THROUGH DATA TRANSPORT

INCORPORATION BY REFERENCE

This application claims priority to the provisional patent application identified by U.S. Ser. No. 61/826,954 titled "A method for service interface encoding to achieve secure and robust network-to-network interface," filed on May 23, 2013, the entire content of which is hereby expressly incorporated herein by reference.

FIELD OF THE DISCLOSURE

The disclosure generally relates to service interface encoding methods for network-to-network interfaces, and more particularly to a protocol to facilitate an edge node transmitting a service request message to a core node of a transport subnetwork to set up a transport path on the edge node's behalf. Upon receipt of the service request, the core node sets up the transport path from an incoming node to an outgoing node in the transport subnetwork based on the service request. In one embodiment, the core node processes the service request without transmitting transport subnetwork information to the edge node.

BACKGROUND

External network-to-network interfaces are used where two heterogeneous networks interface with one another so as to transmit data between the two networks. Examples of heterogeneous networks that may interface with one another include packet-switched networks (TCP/IP networks) and optical transport subnetworks, which use different networking protocols and different domains, such as the electrical domain for the packet network and the optical domain for the optical transport subnetwork. In order for networks with different networking protocols, transport technologies, or management approaches to interface with one another, established interfacing protocols have been developed by industry, such as the External-Network-Network Interface (E-NNI) routing protocol based on the User Network Interface (UNI) [G.8080] routing architecture developed by the Optical Internetworking Forum, for example. Another example of an established routing protocol that may be used as an E-NNI protocol is OSPFv2 [RFC2328] with extensions for traffic engineering [RFC3630] and Generalized Multi-Protocol Labels Switching (GMPLS) [RFC 4202, RFC 4203]. Other E-NNI protocols include OIF E-NNI and IETF E-NNI, for example.

A common interfacing protocol, such as E-NNI, typically specifies a control domain and common signaling and routing protocols so that signaling and routing information can be exchanged between control domains of the interfacing networks. The common interfacing protocol essentially enables requesting and establishing dynamic connections and connection services across heterogeneous, multi-domain networks, such as service subnetworks and transport subnetworks, for example.

Service providers use service subnetworks to provide services to users, such service subnetworks are interfaced with a transport subnetwork, such as a long-haul network or a backbone network. The transport subnetworks carry user data or traffic over long distances to another service subnetwork where the user data or traffic is transferred either to or from. Service providers typically provide networking services directly to users via their respective service subnetwork, and network operators typically provide transport (e.g., backbone, core, or long-haul) network services to the service providers.

To increase efficiency and speed of services provided to users, service providers typically aim to create a logical network between one or more packet routers which are interconnected to one or more optical switches in the transport subnetwork. Further, service providers prefer to apply a typical router setup sequence to establish all connections in the network, which may cause compatibility issues in some cases, and may optimize service for a particular group of customers, and not necessarily for the transport subnetwork as a whole. In order to use a typical router set-up sequence, the service operators query information about the transport subnetwork, such information is created by the transport subnetwork operators and transmitted to the service providers, where such information is stored on one or more of the packet routers in the service subnetwork.

At the same time, transport subnetwork operators may wish to avoid providing internal transport subnetwork information for privacy, accounting or other business-related concerns.

For example, in existing network-to-network interfaces, an edge node (e.g., a packet router acting as a source or headend node in a service subnetwork) interfaces with a core node (e.g., an optical or other switch in a transport subnetwork) to obtain core transport subnetwork information, including transport subnetwork routing and available resource. This same information is likewise provided to a second edge node (e.g., a destination node is a service subnetwork). Next, the edge node locally computes a path for the data that is to be sent via the transport subnetwork, based on the transport subnetwork information provided to the edge node by the core node. After the edge node computes a path, the edge node sends a message including data for the core node to set up the computed path. The core node then stores the received service requests and relays the connection set up messages to the rest of the core nodes in the transport subnetwork. The core node also stores and maintains network state information indicative of the connections set up in the transport subnetwork by the edge nodes.

However, this approach relies on the support of compatible routing and signaling protocols between the service subnetwork and the core network. For example, the core node has to send data about the transport subnetwork to the edge node via Multi-Protocol Label Switching (MPLS) protocols such as Resource Reservation Protocol (RSVP), or Open Shortest Path First (OSPF). Further, edge nodes compute the path locally and typically lack enough information to initiate efficient layer-1 switching, which results in data being sent as IP-over-DWDM (or IP over dumb or statically provisioned pipes), which is inefficient in terms of transport subnetwork resource utilization. Finally, locally computing the path at the edge nodes requires the core nodes to store and maintain network "states" defined and initiated by the edge nodes, which is memory and computationally intensive and inefficient.

SUMMARY OF THE DISCLOSURE

In one aspect, the inventive concepts disclosed herein are directed to a method including the steps of: (1) receiving, by circuitry of a computer system a service request message from an edge node coupled with the circuitry of the computer system. The service request message includes information indicative of a first unique identifier of an ingress port of a first core node, the first core node being within a transport subnetwork, a second unique identifier of an egress port of a second core node within the transport subnetwork, and a requested transport path bandwidth. The method also includes: (2) determining, by the circuitry of the computer system, a transport path through the transport subnetwork between the first core node and the second core node based on the service request message; and (3) forming the transport path between the ingress port of the first core node and the egress port of the second core node.

The computer system may be a component of at least one of the first core node and the second core node.

The edge node may be a first edge node, and the method may also include sending a first acknowledgement message to the first edge node by circuitry of the computer system, and a second acknowledgement message to a second edge node coupled with the second core node.

The first and second unique identifiers in the service request message may be configured to conform to universal resource number format requirements.

The step of determining the transport path may be further defined as accessing a database stored on at least one non-transitory computer readable medium, the database having pre-defined information to form the transport path from the ingress port of the first core node to the egress port of the second core node.

In a further aspect, the inventive concepts disclosed herein are directed to a first core node, including an input interface for receiving traffic, the input interface being configured to be an ingress port to a transport subnetwork, an output interface for transmitting traffic, a switch for communicating the traffic from the input interface to the output interface, and a control module having circuitry for controlling the input interface, the output interface, and the switch. The circuitry of the control module may be configured to receive a service request message. The service request message may include information indicative of a first unique identifier of the ingress port of the first core node, a second unique identifier of an egress port of a second core node within a transport subnetwork including the input interface of the second core node, and a requested transport path bandwidth. The circuitry of the control module may also determine a transport path through the transport subnetwork between the ingress port of the first core node and the egress port of the second core node based on the service request message, and may form the transport path between the ingress port of the first core node and the egress port of the second core node.

The control module may send an acknowledgement message indicative of the formed transport path to a second edge node coupled with the first core node.

The unique identifiers in the service request message may be configured to conform to universal resource numbering format requirements.

The control module of the first core node may also generate information indicative of unique identifiers for the at least one second core node coupled with the first core node, and of unique identifiers of the input interface and the output interface of the first core node and the at least one second core node, and may transmit the information indicative of unique identifiers for at least one second core node coupled with the first core node, and of unique identifiers of the input interface and the output interface of the first core node and the at least one second core node to a network control device coupled with the first node.

In yet another aspect, the inventive concepts disclosed herein are directed to a computer system including a processor configured to receive a service request message including information indicative of a first unique identifier of an ingress port of a first core node, the first core node being within a transport subnetwork, a second unique identifier of an egress port of a second core node within the transport subnetwork, and a requested transport path bandwidth. The processor is also configured to determine a transport path through the transport subnetwork between the ingress port of the first core node and the egress port of the second core node based on the service request message and form the transport path between the ingress port of the first core node and the egress port of the second core node.

The computer system may be a component of at least one of the first core node and the second core node.

The processor may also be configured to receive the service request message from a first edge node coupled to the first core node and to send a first acknowledgement message to the first edge node by circuitry of the computer system, and a second acknowledgement message to a second edge node coupled with the second core node.

The first and second unique identifiers in the service request message may be configured to conform to universal resource number format requirements.

The processor may be configured to determine the transport path by accessing a database stored on at least one non-transitory computer readable medium, the database having pre-defined information to setup the transport path from the ingress port of the first core node to the egress port of the second core node.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION OF EXEMPLARY EMBODIMENTS

The following detailed description refers to the accompanying drawings. The same reference numbers in different drawings may identify the same or similar elements or features.

If used throughout the description and the drawings, the following short terms have the following meanings unless otherwise stated:

GMPLS stands for Generalized Multi-Protocol Label Switching, which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force.

IP stands for Internet Protocol which is a protocol used for communicating data across a packet-switched internetwork using the Internet Protocol Suite, also referred to as TCP/IP.

OIF stands for Optical Internetworking Forum.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OSC stands for Optical Supervisory Channel which is an additional wavelength that normally carries network management information within an optical network.

OTN stands for Optical Transport subnetwork which includes a set of optical switch nodes which are connected by optical fiber links. ITU-T recommendations G.709 and G.872 define OTN interface requirements and network architecture respectively.

SONET/SDH stands for Synchronous Optical Networking/Synchronous Digital Hierarchy which are standardized multiplexer protocols that transfer multiple digital bit streams over optical fiber using lasers or light emitting diodes.

TE stands for traffic engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are directed to methods for interconnecting heterogeneous networks such as packet subnetworks and optical transport subnetworks. An edge node from a service subnetwork (e.g., a packet network) sends a service request message to a core node of a transport subnetwork (e.g., OTN). The message may be encoded via a universal resource number format and may include a first unique identifier of an ingress port of a first transport subnetwork node, a second unique identifier of an egress port of a second transport subnetwork node, and the bandwidth of the requested transport path. The core node computes and sets up the requested transport path based on the service request message, and transmits a connection success message to the requesting service subnetwork edge node once the requested transport path has been successfully set up.

As will be appreciated by person of ordinary skill in the art, a method according to the inventive concepts disclosed herein enables full transport path computation through the transport subnetwork between core nodes by including sufficient information for a core node to set up the connection in the service request message, such that no special network state information is stored and managed by the core nodes. The known unique identifiers of the core nodes in the transport subnetwork, and the unique identifiers for the physical parts of the core nodes may be already available to the operator of the service subnetwork in a database accessible by the edge nodes and/or an operator control device used to administer the service subnetwork. Further, methods according to the inventive concepts disclosed herein can adapt packet network configuration methodologies to optical transport subnetworks by allowing OTN switching connections to be configured similarly to interfacing packet routers or edge nodes.

Methods according to the inventive concepts disclosed herein may provide sufficient feedback and automation so that "plug-and-play", or stated otherwise, substantially fully automated interface setup between heterogeneous networks (e.g., a packet network) is achieved. Further, methods according to the inventive concepts disclosed herein may make use of OTN switching technology in transport subnetworks, thereby allowing transport subnetwork operators to avoid revealing interior transport subnetwork information, and in some exemplary embodiments can yield router bypass functionality as will be described below.

Figure 1:
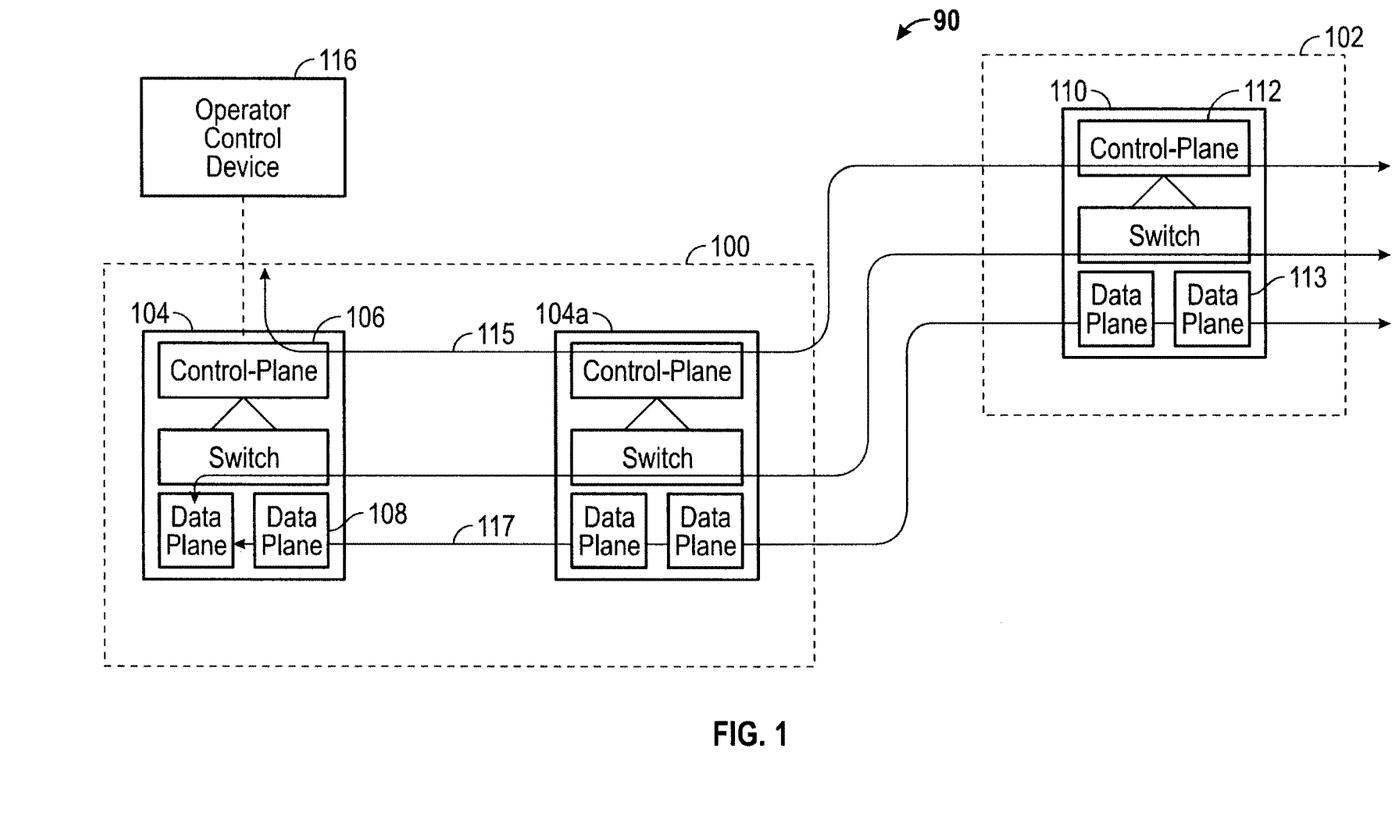
FIG. 1 is an example of a portion of a network including a service subnetwork and a transport subnetwork according to the inventive concepts disclosed herein showing block diagrams of nodes within the network having data planes for passing data between the nodes and control planes for operating and administrating the nodes.

Referring now to the drawings, and in particular to FIG. 1, shown therein a portion of a network 90 having a service subnetwork 100 interfaced to a transport subnetwork 102.

The service subnetwork 100 includes one or more nodes 104, including an edge node 104a which interfaces with the transport subnetwork 102. The nodes 104 within the service subnetwork 100 include a control plane 106 and a data plane 108.

The transport subnetwork 102 includes a plurality of core nodes 110 (only one being shown in FIG. 1), and at least one core node 110 may be referred to as an incoming core node 110 and may interface with the edge node 104a of the service subnetwork 100, for example. The at least one core node 110 of the transport subnetwork 102 also includes a control plane 112 and a data plane 113, for example.

The control planes 106 of the edge nodes 104 within the service subnetwork 100 are coupled with the control plane 112 of the at least one core node 110 of the transport subnetwork 102 via links 115 so that control information (e.g., one or more control messages) may be exchanged by the control plane 106 and the control plane 112. The data plane 108 of the at least one node 104 of the service subnetwork 100 is coupled with the data plane 113 of the at least one core node 110 of the transport subnetwork 102 via link(s) 117, such that data (e.g., user data including packets) may be exchanged between the data planes 108 and the data plane 113.

The network 90 also includes at least one operator control device 116 that may be operably coupled with the control plane 106 of the edge node 104a of the service subnetwork 100. More particularly, the operator control device 116 may be operably coupled with the control plane 106 and may be used by an operator of the service subnetwork 100 to control the interface between the service subnetwork 100 and the transport subnetwork 102, for example.

The service subnetwork 100 and the transport subnetwork 102 may be heterogeneous with respect to one another, for example, the service subnetwork 100 may be a packet network (e.g., TCP/IP network), and the transport subnetwork 102 may be an optical network (e.g., OTN).

Figure 2:
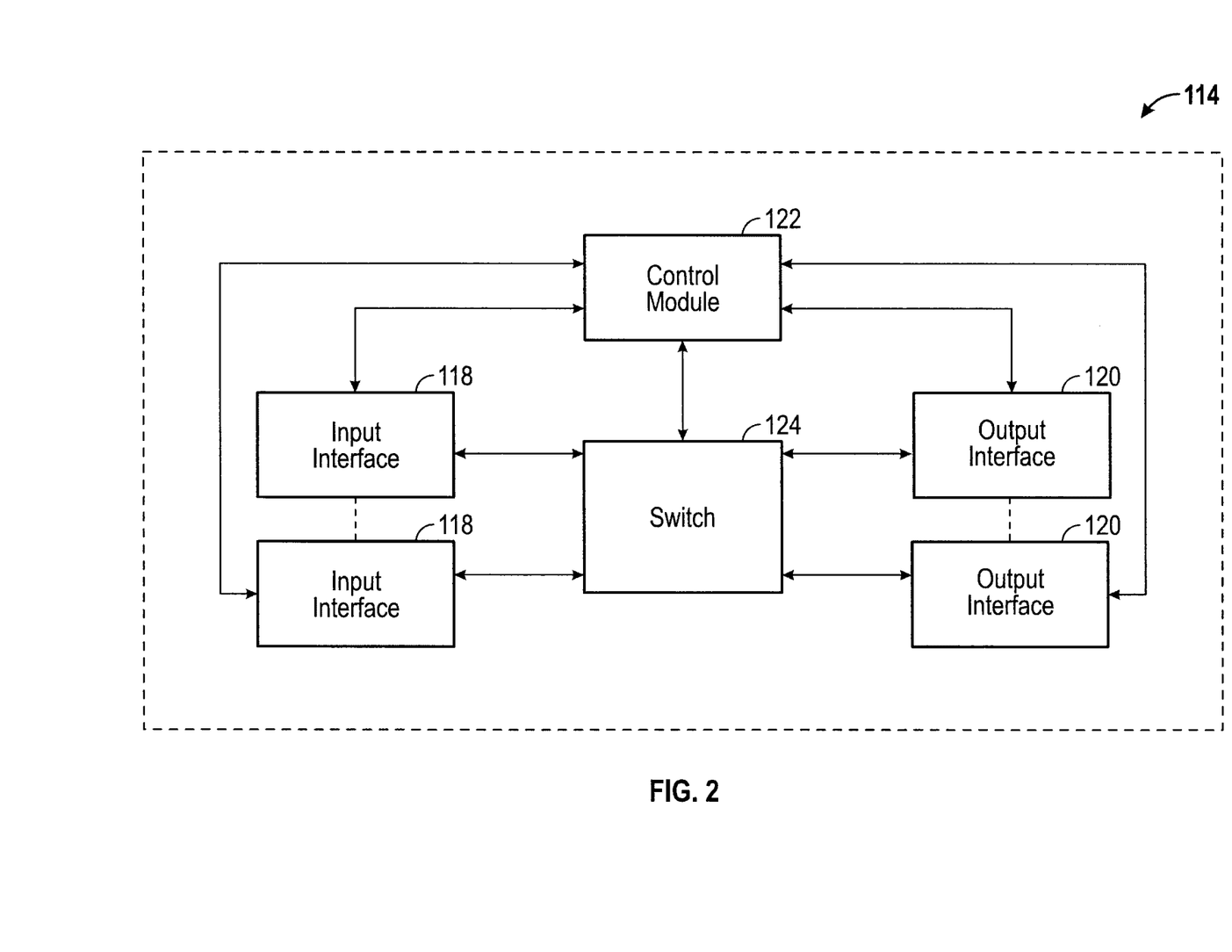
FIG. 2 is a block diagram of an exemplary node constructed in accordance with the inventive concepts disclosed herein for communicating via the network of FIG. 1.

Referring now to FIG. 2, shown therein is a block diagram of an exemplary embodiment of a node 114 constructed in accordance with the present disclosure. The node 114 may be implemented as the edge node 104a and/or as the core node 110 in the network 90 shown in FIG. 1 depending upon the desired use and construction of the node 114. The node 114 is configured to facilitate the communication of data (which may be referred to herein as "traffic") between multiple nodes (e.g., nodes 104, 104a, or 110) in one or more network (e.g., the service subnetwork 100 and the transport subnetwork 102 shown in FIG. 1).

The node 114 is provided with one or more input interfaces 118, one or more output interfaces 120, a control module 122, and a switch 124. The nodes 104, 104a, and 110 in FIG. 1 can be constructed in a similar manner as the node 114.

In general, the input interfaces 118 are configured to receive traffic from the service subnetwork 100 or the transport subnetwork 102, and the output interfaces 120 are configured to transmit traffic onto the service subnetwork 100 and/or onto the transport subnetwork 102. The switch 124 serves to communicate the traffic from the input interface(s) 118, to the output interface(s) 120. The control module 122 serves to control the operations of the input interfaces 118, the output interfaces 120, and the switch 124.

The control module 122 may run any suitable network protocol, such as a protocol conforming to the requirements of GMPLS and can be referred to herein as a control plane (e.g., the control plane 106 or 112 shown in FIG. 1). The control module 122 may use GMPLS protocols to setup one or more transport paths through the transport subnetwork 102 as will be described below. During a negotiation between the control planes 106 and 112 of the nodes 104a and 110 (e.g., as illustrated in FIG. 1), labels may be allocated for in-band signaling as part of the GMPLS processing, for example, as will be appreciated by persons of ordinary skill in the art having the benefit of the instant disclosure.

The node 114 can be implemented in a variety of manners, including commercial installations having one or more backplanes (not shown), racks, and the like. In this example, the input interfaces 118, the output interfaces 120, the control module 122 and the switch 124 are typically implemented as separate devices, which may have their own power supply, local memory and processing equipment. In another example, the node 114 can be implemented as a single device having a shared power supply, memory and processing equipment. Further, in another example, the node 114 can be implemented in a modular manner in which one or more of the input interfaces 118, the output interfaces 120, the control module 122 and the switch 124 share a power supply and/or housing.

The input interfaces 118, and the output interfaces 120 of one node 114 are configured to communicate with corresponding input interfaces 118 via links 115 and 117 (FIG. 1), and output interfaces 120 of another node 114 via one or more communication links (e.g., 115 and 117, FIG. 1), or to communicate with corresponding input interfaces 118 and output interfaces 120 of the core node(s) 110 in the transport subnetwork 102.

An example of an input interface 118 and/or an output interface 120 is an Ethernet card, optical port, or a physical port. In general, each of the input interfaces 118 and/or the output interfaces 120 may have a unique logical identification, such as an IP address. In some exemplary embodiments, each of the nodes 114 may be assigned a unique identifier such as a namespace identifier (in a URN format) and each input interface 118 and output interface 120 may be assigned a unique identifier such as a namespace specific string (in a URN format).

The communication links 115 and 117 can be implemented in a variety of manners, such as a physical link including electrical (e.g., copper wire or coax) and/or optical signal (e.g., optical fiber or other waveguide) carrying capabilities, or as a wireless link or a logical link. The implementation of the input interfaces 118 and the output interfaces 120 will depend upon the particular type of communication link 115 and 117 that the particular input interface 118 and/or output interface 120 is designed to communicate over. For example, one of the input interfaces 118 can be designed to communicate wirelessly with another node 104 or 110 within the service subnetwork 100 and/or the transport subnetwork 102, while one of the output interfaces 120 of the node 104 can be designed to communicate optically through a fiber-optic link. For a particular node 114, the input interfaces 118 can be of the same type or different types; the output interfaces 120 can be of the same type or different types, and the input and output interfaces 118 and 120 can be of the same type or different types.

In accordance with the present disclosure, messages and/or service requests transmitted between the nodes 114 can be processed by circuitry within the input interface(s) 118, and/or the output interface(s) 120 and/or the control module 122. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient or non-transitory memory. Exemplary non-transient memory includes random access memory, read only memory, flash memory or the like. Such non-transient memory can be electrically based or optically based. Further, the messages described herein may be generated by the components and result in various physical transformations.

It should be understood that the node 114 can be implemented in a variety of manners including those shown and discussed in U.S. Patent Publication No. 2009/0245289 entitled "Programmable Time Division Multiplexed Switching" the entire content of which is hereby incorporated herein by reference.

Figure 3:
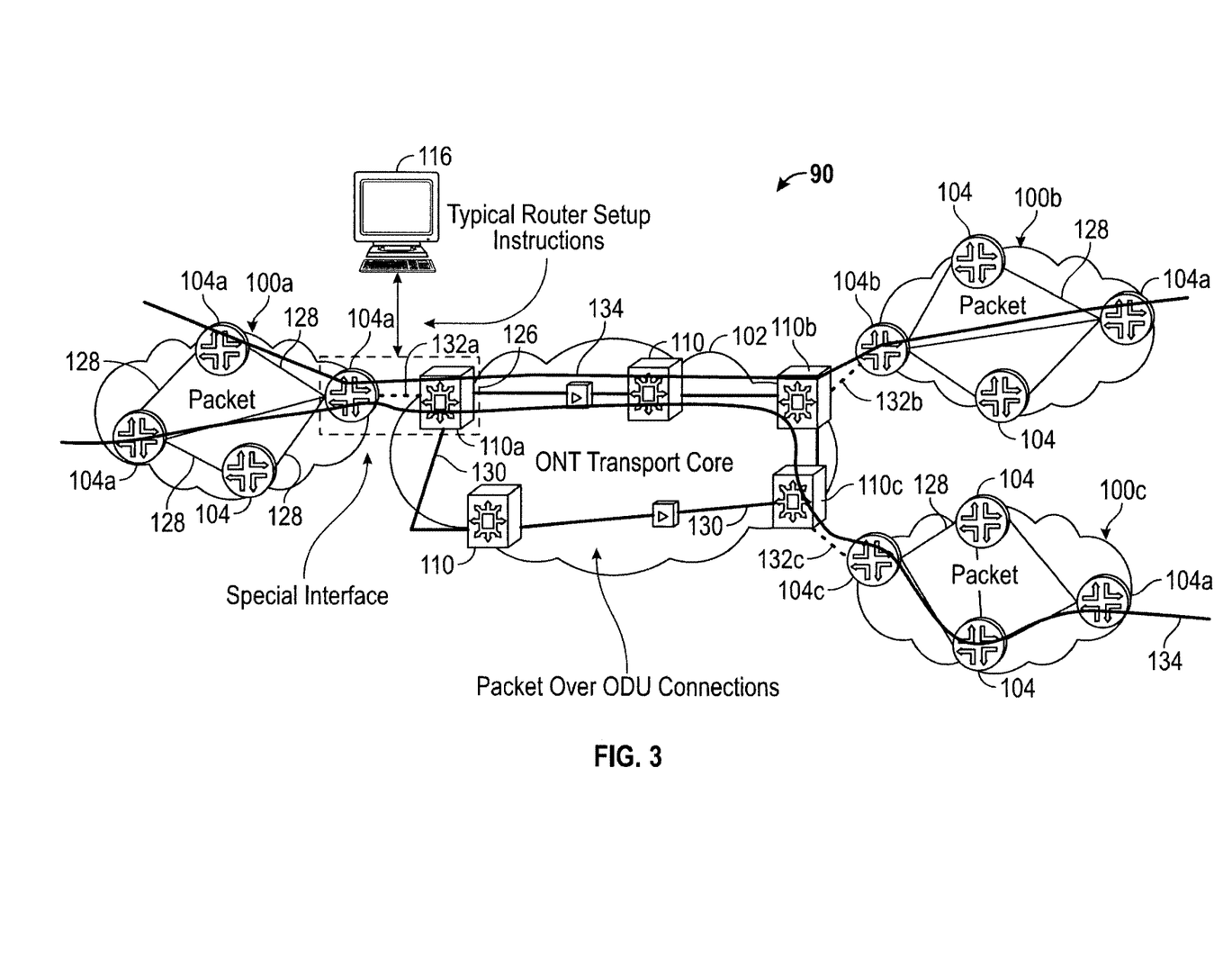
FIG. 3 is a block diagram of the network depicted in FIG. 1.

Referring now to FIG. 3, shown therein is an exemplary embodiment of the network 90 having first, second and third service subnetworks 100a, 100b, and 100c that are coupled together via the transport subnetwork 102. To facilitate communication between the first, second and third service subnetworks 100a, 100b, and 100c, and the transport subnetwork 102 a heterogeneous network interface is also provided. For example, shown in FIG. 3 by way of dashed lines is a heterogeneous network interface 126 between the first service subnetwork 100a and the transport subnetwork 102. The transport subnetwork 102 also interfaces with the second service subnetwork 100b and the third service subnetwork 100c via heterogeneous network interfaces (not shown). The first, second, and third service subnetworks 100a-c are shown by way of example as packet networks, and the transport subnetwork 102 is shown by way of example as an OTN network.

The first, second and third service subnetworks 100a-c include nodes 104 operably coupled with links 128 and the transport subnetwork 102 includes nodes 110 coupled with links 130. The edge node 104a of the service subnetwork 100a is coupled with a core node 110a of the transport subnetwork 102 via a link 132a, a core node 110b of the transport subnetwork 102 is coupled with an edge node 104b of the service subnetwork 100b via a link 132b, and a core node 110c is coupled with an edge node 104c via link 132c. The operator control device 116 is shown as operably coupled with the heterogeneous network interface 126 between the first service subnetwork 100a and the transport subnetwork 102.

In this example, an operator of the service subnetwork 100a attempts to create a logical entity (e.g., a transport path) including at least one of the edge nodes 104a in the service subnetwork 100a and one or more core nodes 110a in the transport subnetwork 102 for efficient data transport. The operator may use the operator control device 116 to send a service request message to the control plane 106 of one of the edge nodes 104 to set up a transport path.

Figure 4:
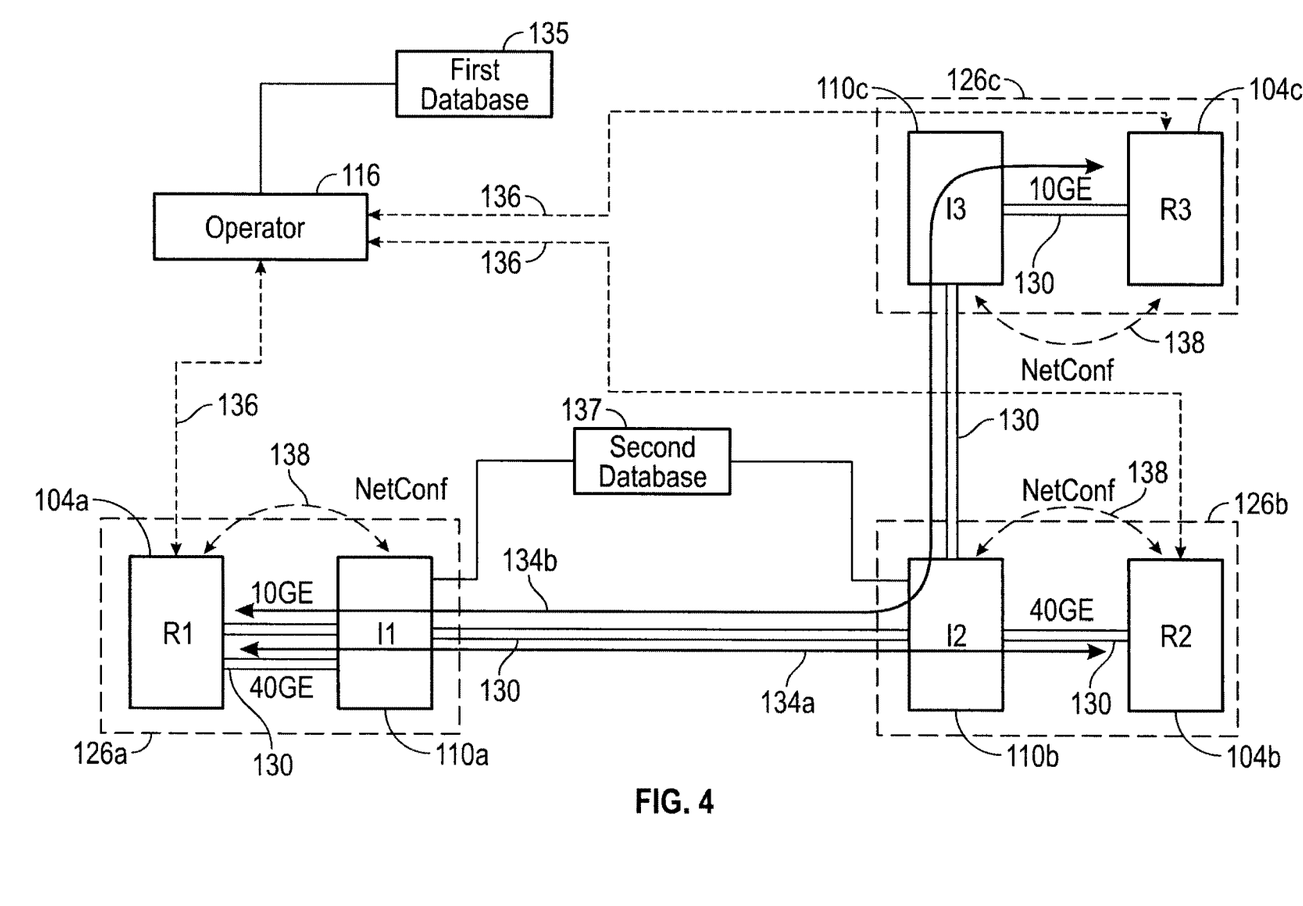
FIG. 4 is a block diagram of a portion of the network that has been arranged to show network interfaces between certain edge nodes within the service subnetwork and core nodes within the transport subnetwork according to the inventive concepts disclosed herein.
Figure 5:
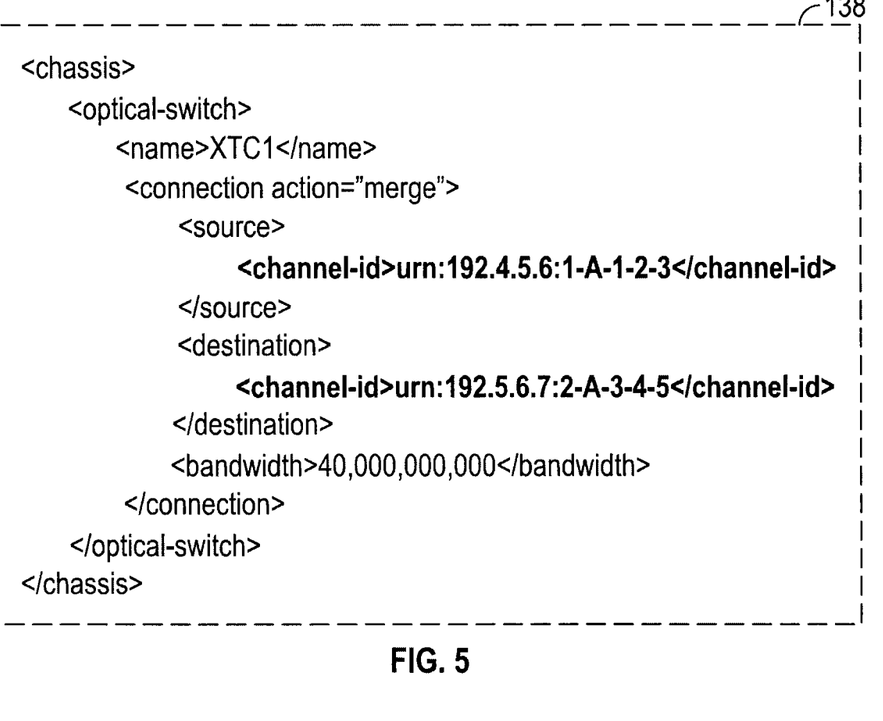
FIG. 5 is an exemplary embodiment of a service request message sent by an edge node to a core node according to the inventive concepts disclosed herein.
Figure 6:
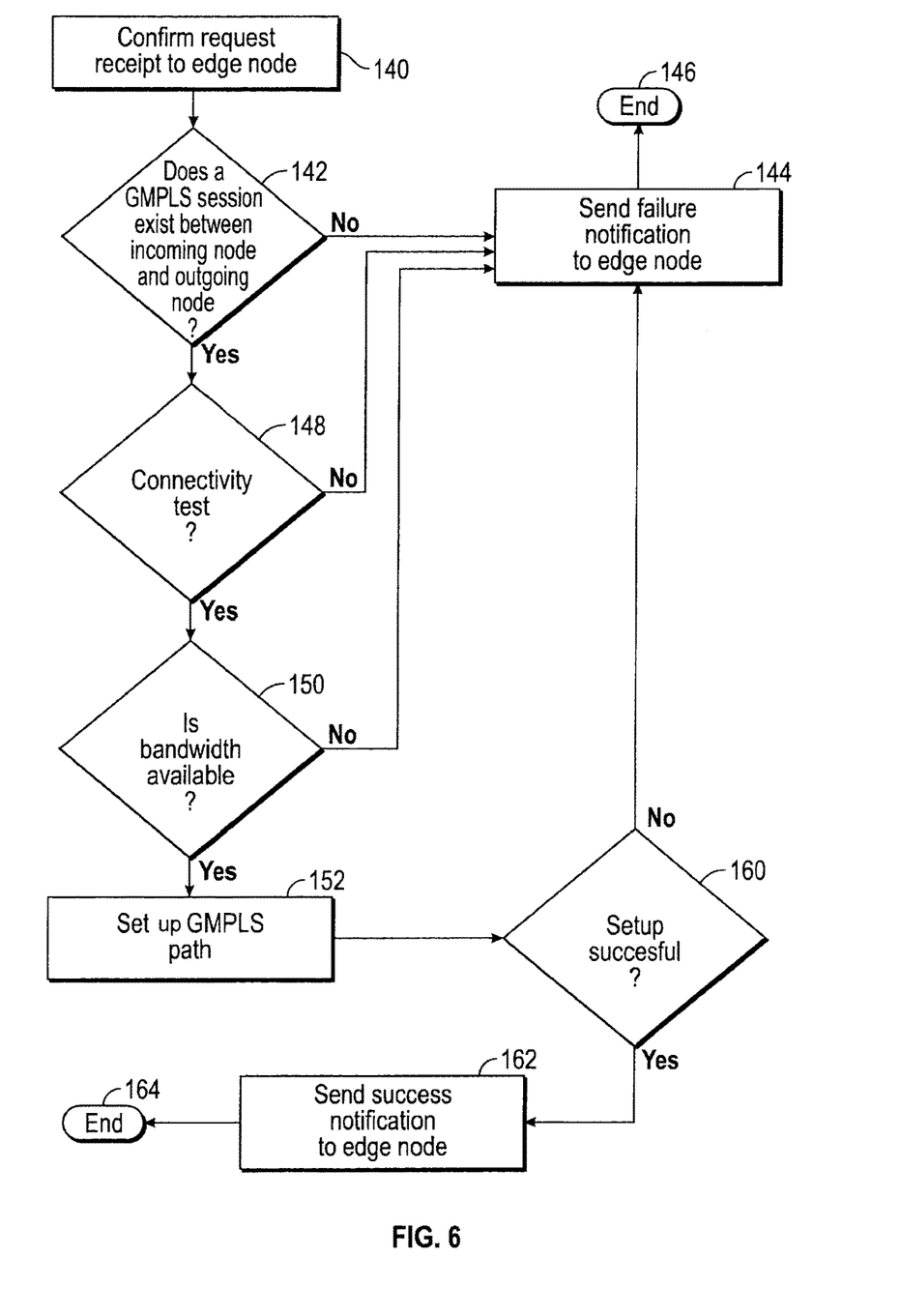
FIG. 6 is a logic flow diagram of an exemplary method of service request processing carried out by a core node of a transport subnetwork according to the inventive concepts disclosed herein.

Referring now to FIGS. 4-6, a simplified version of the network 90 is shown in which specific edge nodes 104a-c are paired with specific core nodes 110a-c, and the core nodes 110a-c are programmed to set up transport paths on behalf of the edge nodes 104a-c.

The information that will be used for setting up the transport paths by the core nodes 110a-c in the transport subnetwork 102 may be collected ahead of time, stored in a first database 135 (e.g., in a non-transitory computer readable medium), and made available to the operator control device 116. The information may uniquely identify the core nodes 110 in the transport subnetwork 102 and the physical ports (e.g., input interfaces 118 and/or output interfaces 120) on the core nodes 110 in the transport subnetwork 102. The information uniquely identifying the core nodes 110 and the respective physical ports (e.g., interfaces 118 or 120) may be in a URN format in some exemplary embodiments of the inventive concepts disclosed herein.

Referring now to FIG. 4, shown therein is an exemplary embodiment of three network interfaces 126a-c between the service subnetworks 100a-c and the transport subnetwork 102 of FIG. 3 according to the inventive concepts disclosed herein. The interface 126a is shown between the edge node 104a (of the service subnetwork 100a) and the core node 110a. Similarly, the interface 126b is shown between the core node 110b and the edge node 104b, and the interface 126c is shown between the core node 110c and the edge node 104c. The operator control device 116 is shown coupled with the control plane 106 (depicted in FIG. 1) of the edge nodes 104a-c via control plane connections 136. The core node 110a is coupled with the core node 110b, and the core node 110b is coupled with the core node 110c via links 130.

Service request messages transmitted from the edge node 104a to the core node 110a, for example, may be initiated by the operator control device 116, and may be encoded using any desired generic messaging protocol, such as XML or NetConf, for example.

For each transport path set up according to the inventive concepts disclosed herein, the service request message may include a first unique identifier of an ingress port of a first transport subnetwork node, such as the core node 110a, a second unique identifier of an egress port of a second transport subnetwork node such as the core node 110b, and the bandwidth of the requested transport path or path. The first and second unique identifiers can be obtained by the operator control device 116 from the first database 135. When the core node 110a receives the service request message, the core node 110a determines the core nodes 110 and the links 130 to include in the transport path, and then sets up the requested transport path by signaling other core nodes such as the core node 110b on the transport path, and transmits a connection success message to the edge node 104a that transmitted the service request message that resulted in the transport path. The transport subnetwork 102 may include a second database 137 storing predetermined GMPLS sessions having information accessed by the core nodes 110 and used to form transport paths between ingress ports and egress ports of the transport subnetwork 102.

Shown in FIG. 4 are two transport paths 134a and 134b. The core node 110a may set up the transport paths 134a and 134b by receiving the service request message 138, extracting the connection information and associated encoding from the service request message 138, computing (or otherwise determining) an optimal connection path (e.g., the transport path 134a and/or 134b) through the transport subnetwork 102, setting up the computed optimal connection (e.g., the transport path 134a and/or 134b), and notifying the edge node 104a of the successful set up of the transport path 134a or 134b. In case of connection failure, the core node 110a may notify the edge node 104a using the same encoding as the service request message 138, for example.

The core node 110a functions as an incoming core node for transport paths 134a (e.g., having a bandwidth of 40 Gbps) and 134b (e.g., having bandwidth 10 Gbps). The core node 110b functions as an outgoing core node for the transport path 134a and the core node 110c functions as an outgoing core node for the transport path 134b.

Shown in FIG. 5 is an example of a service request message 138 for setting up the transport path 134a. In this example, the first unique identifier includes an IP address of the first transport subnetwork node, e.g., the core node 110a (192.4.5.6); and a Port ID on the core node 110a (1-A-1-2-3). The second unique identifier includes an IP address of the second transport subnetwork node, e.g., the core node 110b (192.5.6.7); and a Port ID on the core node 110b (2-A-3-4-5); and a requested bandwidth of 40 Gbps.

The encoding method for generating and transmitting the service request message 138 may be network technique-agnostic, e.g., by not using IP addresses. In this example, the operator control device 116, the edge nodes 104a-c and the core nodes 110a-c may be configured to conform to the requirements of any desired communication protocol, such as a protocol known in the art as "NetConf."

The transport path 134a may be identified as follows: core node 110a (IP=192.4.5.6, Port ID=1-A-1-2-3) to core node 110b (IP=192.5.6.7, Port ID=2-A-3-4-5), bandwidth=40 Gbps. Similarly, the transport path 134b may be identified as core node 110a (IP=192.4.5.6, Port ID=1-A-2-2-3) to core node 110c (IP=192.6.7.8, Port ID=1-A-2-5-6), bandwidth=10 Gbps. The service request message 138 shown in FIG. 5 may be transmitted from the edge node 104a to the core node 110a, which then sets up the transport path 134a. The transport path 134b can be set up in a similar manner by sending another service request message 138 from the edge node 104a to the core node 110a.

As shown in FIG. 5, in some exemplary embodiments, the service request message 138 (or encoding) to set up the transport path 134a may follow a Universal Resource Number (URN) standard format and may include a namespace identifier (NID) (which in this case is an edge node IP address), and a namespace specific string (NSS) (in this case a physical port ID on the core node) in the form of URN:<NID>:<NSS>. The NID uniquely identifies the transport edge node id (e.g., mynetwork:192.37.1.1)m and the NSS encodes the configurable hierarchy (e.g., <chassis>-<shelf>-<slot>-<sub-slot>-<port>-<logical port>) For example, 1-A-2-3-1-100 may mean upper chassis, shelf A, slot 2, time-slot 3, port 1, VLAN 100 on a node constructed by the assignee of the present patent application, i.e., Infinera Corporation, and sold under the model number DTN-X. However, the exact encoding and hierarchy definition is not limited to Infinera equipment, and may vary depending on the construction and/or protocols of the nodes 110.

As another example, addressing a particular port (DTN-X TIM) may include URN:mynetwork:192.37.1.1: 1-A-2-3-1, and addressing to a VLAN on a particular port (DTN-X PTIM) may include URN:mynetwork:192.37.1.1: 1-A-2-3-1-100.

Referring now to FIG. 6, an exemplary logic sequence used for processing the service request message 138 of FIG. 5, for example, by the core node 110a to set up the transport path 134a may include the following:

In a step 140, the core node 110a may confirm the receipt of the service request message 138 to the edge node 104a (R1), by sending a RPC reply with OK, for example.

In a step 142, the core node 110a may look up an existing GMPLS session from the second database 137 using the first and second unique identifiers (e.g., an ingress port on the core node 110a uniquely identified by 192.4.5.6:1-A-1-2-3 to an egress port on the core node 110b (e.g., uniquely identified by 192.5.6.7:2-A-3-4-5) and may determine if a GMPLS session exists. If the GMPLS session does not exist, the logic sequence may branch to a step 144, where the core node 110a sends a RPC reply to the edge node 104a to report failure. The logic sequence may end at step 146.

In a step 148, the core node 110a checks the connectivity between the input interface 118 (e.g., uniquely identified by 1-A-1-2-3) on the core node 110a and the output interface 120 (e.g., uniquely identified by 2-A-3-4-5) on the core node 110b (from the GMPLS database). If the connectivity is not available, the logic sequence cycles to step 144.

If the connectivity is available, the core node 110a checks if the bandwidth between the input interface 118 of the core node 110a (e.g., uniquely identified by 1-A-1-2-3) and the output interface 120 of the core node 110b (e.g., uniquely identified by 2-A-3-4-5) is more than 40 Gbps (e.g., from the GMPLS database) in a step 150. If the bandwidth is less than 40 Gbps (e.g., not enough resources are available), the logic sequence cycles to step 144.

If sufficient bandwidth is available, the core node 110a sets up a GMPLS LSP (i.e., the transport path 134a) between the input interface 118 (e.g., uniquely identified by 1-A-1-2-3) of the core node 110a and the output interface 120 (e.g., uniquely identified by 2-A-3-4-5) of the core node 110b for 40 Gbps in a step 152.

If the setup of the transport path 134a is successful as determined in step 160, the logic sequence causes circuitry of the core node 110a to send a confirmation to the edge node 104a in a step 162 and ends in step 164. If the setup of the transport path 134a is not successful, the logic sequence cycles to step 144.

In some exemplary embodiments where a connection failure is detected by the core node 110a, the core node 110a may trace the record of the failed connection in the GMPLS database, and may put together the original connections URN's (e.g., <source><channel-id>urn:192.4.5.6:1-A-1-2-3</channel-id></source>; <destination><channel-id>urn: 192.5.6.7:2-A-3-4-5</channel id></destination>), and reports the failure to the edge node 104a.

The transport path 134b may be set up and may be managed similarly to the transport path 134a, and may fully utilize GMPLS switching inside the transport subnetwork 102. In some exemplary embodiments, the transport path 134b may perform a router bypass at core node 110b, such that the traffic does not go through core node 110b, as shown in FIG. 4, as will be appreciated by persons of ordinary skill in the art having the benefit of the instant disclosure.

Methods according to the inventive concepts disclosed herein enable an encoding (e.g., a service request) on transport paths within transport subnetworks, which includes the required information on the encoding itself, such that special states do not need to be stored and managed on transport subnetwork core nodes. In one embodiment, pre-defined transport paths between the ingress and egress ports of the transport subnetwork 102 are stored in the database and made available to the core nodes 110a-c, for example, within the transport subnetwork 102.

In this way, the transport operators do not need to reveal interior information of the transport subnetwork 102 to operators of the service subnetworks 100a-c.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that performs one or more functions. The term "component" or "circuitry" may include hardware, such as a processor, an application specific integrated circuit (ASIC), or a field programmable gate array (FPGA), or a combination of hardware and software.

Further, while implementations have been described in the context of an optical network, this need not be the case. These implementations may apply to an electronic network using copper cabling, or even a wireless network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A method, comprising:
   receiving, by circuitry of a computer system, a service request message from an edge node of a service subnetwork coupled with the circuitry of the computer system, the service request message including information indicative of:
   a first unique identifier of an ingress port of a first core node, the first core node being within a data transport subnetwork;
   a second unique identifier of an egress port of a second core node within the data transport subnetwork; and
   a requested transport path bandwidth;
   determining, by the circuitry of the computer system, a transport path through the data transport subnetwork between the first core node and the second core node based on the service request message, without transmitting routing information and available resource information of the data transport subnetwork to the edge node; and
   forming the transport path between the ingress port of the first core node and the egress port of the second core node, to transport data traffic through the data transport subnetwork to or from the edge node of the service subnetwork.

2. The method of claim 1, wherein the computer system is a component of at least one of the first core node and the second core node.

3. The method of claim 1, wherein the edge node is a first edge node, and further comprising sending, by circuitry of the computer system, a first acknowledgement message to the first edge node and a second acknowledgement message to a second edge node of the service subnetwork coupled with the second core node.

4. The method of claim 1, wherein the first and second unique identifiers in the service request message are configured to conform to universal resource number format requirements.

5. The method of claim 1, wherein the step of determining the transport path is defined further as accessing a database stored on at least one non-transitory computer readable medium, the database having pre-defined information to form the transport path from the ingress port of the first core node to the egress port of the second core node.

6. The method of claim 1, wherein the service subnetwork is a packet network and the data transport subnetwork is an optical transport network (OTN).

7. A first core node, comprising:
   an input interface for receiving data traffic, the input interface being configured to be an ingress port to a data transport subnetwork;
   an output interface for transmitting the data traffic;
   a switch for communicating the data traffic from the input interface to the output interface; and
   a control module having circuitry for controlling the input interface, the output interface, and the switch, the circuitry of the control module configured to:
   receive a service request message from an edge node of a service subnetwork, the service request message including information indicative of:
   a first unique identifier of the ingress port of the first core node;
   a second unique identifier of an egress port of a second core node within the data transport subnetwork including the input interface of the second core node; and
   a requested transport path bandwidth;
   determine, by circuitry of the first core node, a transport path through the data transport subnetwork between the ingress port of the first core node and the egress port of the second core node based on the service request message, without transmitting routing information and available resource information of the data transport subnetwork to the edge node; and
   form the transport path between the ingress port of the first core node and the egress port of the second core node, to transport data traffic through the data transport subnetwork to or from the edge node of the service subnetwork.

8. The first core node of claim 7, wherein the edge node is a first edge node and wherein the circuitry of the control module is further configured to send an acknowledgement message indicative of formation of the transport path to at least one of the first edge node and a second edge node of the service subnetwork coupled with the second core node.

9. The first core node of claim 7, wherein the first and second unique identifiers in the service request message are configured to conform to universal resource numbering format requirements.

10. The first core node of claim 7, wherein the control module of the first core node:
    generates information indicative of unique identifiers for the at least one second core node coupled with the first core node, and of unique identifiers of the input interface and the output interface of the first core node and the at least one second core node; and
    transmits the information indicative of unique identifiers for at least one second core node coupled with the first core node, and of unique identifiers of the input interface and the output interface of the first core node and the at least one second core node to a network control device coupled with the first core node.

11. The first core node of claim 7, wherein the circuitry of the control module is configured to determine, by circuitry of the first core node, the transport path through the data transport subnetwork between the ingress port of the first core node and the egress port of the second core node based on the service request message and at least one of an existence of a Generalized Multi-Protocol Labels Switching (GMPLS) session between the first core node and the second core node, a status of connectivity between the first core node and the second core node, and an amount of available bandwidth between the first core node and the second core node.

12. The first core node of claim 7, wherein the service subnetwork is a packet network and the data transport subnetwork is an optical transport network (OTN).

13. A computer system, comprising:
a processor configured to receive a service request message from an edge node of a service subnetwork including information indicative of:
a first unique identifier of an ingress port of a first core node within a data transport subnetwork;
a second unique identifier of an egress port of a second core node within the data transport subnetwork; and
a requested transport path bandwidth; and
wherein the processor is further configured to determine a transport path through the data transport subnetwork between the ingress port of the first core node and the egress port of the second core node based on the service request message, without transmitting routing information and available resource information of the data transport subnetwork to the edge node and to form the transport path between the ingress port of the first core node and the egress port of the second core node, to transport data traffic through the data transport subnetwork to or from the edge node of the service subnetwork, and
wherein the computer system is a component of at least one of the first core node and the second core node.

14. The computer system of claim 13, wherein the edge node is a first edge node coupled to the first core node, and wherein the processor is configured to receive the service request message from the first edge node and to send a first acknowledgement message to the first edge node by circuitry of the computer system, and a second acknowledgement message to a second edge node of the service subnetwork coupled with the second core node.

15. The computer system of claim 13, wherein the first and second unique identifiers in the service request message are configured to conform to universal resource number format requirements.

16. The computer system of claim 13, wherein the processor is configured to determine the transport path by accessing a database stored on at least one non-transitory computer readable medium, the database having pre-defined information to setup the transport path from the ingress port of the first core node to the egress port of the second core node.

17. The computer system of claim 13, wherein the service subnetwork is a packet network and the data transport subnetwork is an optical transport network (OTN).

* * * * *